US012637564B2

(12) United States Patent
Jung et al.

(10) Patent No.: US 12,637,564 B2
(45) Date of Patent: May 26, 2026

(54) BIODEGRADABLE POLYMER-GELATIN HYDROGEL COMPOSITE, METHOD FOR MANUFACTURING SAME, AND MEDICAL IMPLANT COMPRISING BIODEGRADABLE POLYMER-GELATIN HYDROGEL COMPOSITE

(71) Applicant: KOREA INSTITUTE OF SCIENCE AND TECHNOLOGY, Seoul (KR)

(72) Inventors: Young Mee Jung, Seoul (KR); Inchan Youn, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 831 days.

(21) Appl. No.: 17/980,846

(22) Filed: Nov. 4, 2022

(65) Prior Publication Data

US 2023/0142889 A1 May 11, 2023

(30) Foreign Application Priority Data

Nov. 5, 2021 (KR) ........................ 10-2021-0151559

(51) Int. Cl.
| | |
|---|---|
| *C08F 2/46* | (2006.01) |
| *C08F 2/50* | (2006.01) |
| *C08G 61/04* | (2006.01) |
| *C08L 67/04* | (2006.01) |

(52) U.S. Cl.
CPC .................................... *C08L 67/04* (2013.01)

(58) Field of Classification Search
CPC .................................. C08L 67/04; C08L 89/06
USPC ........... 522/38, 33, 6, 189, 184, 71, 1; 520/1
See application file for complete search history.

(56) References Cited

FOREIGN PATENT DOCUMENTS

KR 10-2019-0084710 A 7/2019

OTHER PUBLICATIONS

Safijavan et al., Biological behavior study of gelatin coated PCL nanofiberous electrospun scaffolds using fibroblasts, 2014, Journal of Paramedical Sciences (JPS), vol. 5, No. 1, 67-73 (Year: 2014).*
Lim et al., One-step photoactivation of a dual-fictionalized bioink as cell carrier and cartilage binding glue for chondral regeneration, 2020, Adv. Healthcare Mater., 9, 1-13 (Year: 2020).*
Safaeijavan, Raheleh, et al. "Biological behavior study of gelatin coated PCL nanofiberous electrospun scaffolds using fibroblasts." Archives of Advances in Biosciences 5.1, 2014, (7 pages).
Lim, Khoon S., et al. "One-Step Photoactivation of a Dual-Functionalized Bioink as Cell Carrier and Cartilage-Binding Glue for Chondral Regeneration." Advanced healthcare materials 9.15 (2020): 1901792., (13 pages).
Kim, Woo-Jin, et al. "Characteristics and Biocompatibility of Electrospun Nanofibers with Poly (L-lactide-co-ε-caprolactone)/Marine Collagen." Polymer (Korea) 36.2, 2012, (Abstract in English, 7 pages in Korean).

* cited by examiner

*Primary Examiner* — Jessica Whiteley
(74) *Attorney, Agent, or Firm* — NSIP Law

(57) ABSTRACT

The present disclosure relates to a biodegradable polymer-gelatin hydrogel composite, a method for preparing the same and a medical implant including the biodegradable polymer-gelatin hydrogel composite. The multi-layered biodegradable polymer-gelatin hydrogel composite of the present disclosure, wherein the biodegradable polymer membrane of a 3D reticular structure and the gelatin hydrogel are stacked, has superior durability and resilience and may exhibit improved elasticity and swellability upon wetting under hydration environment. In addition, it can be shrunk down to 50% of its initial volume upon drying and can maintain elasticity even after the shrinkage. Furthermore, when used in a medical implant, it can protect the joint from the frictional environment in the body, reinforce the muscle torn or ruptured by trauma, relive pain by maintaining space, and induce the improvement of symptoms.

1 Claim, 5 Drawing Sheets

BIODEGRADABLE POLYMER-GELATIN HYDROGEL COMPOSITE, METHOD FOR MANUFACTURING SAME, AND MEDICAL IMPLANT COMPRISING BIODEGRADABLE POLYMER-GELATIN HYDROGEL COMPOSITE

CROSS-REFERENCE TO RELATED APPLICATION

This application claims priority to Korean Patent Application No. 10-2021-0151559 filed on Nov. 5, 2021, and all the benefits accruing therefrom under 35 U.S.C. § 119, the contents of which in its entirety are herein incorporated by reference.

BACKGROUND

1. Field

The present disclosure relates to a biodegradable polymer-gelatin hydrogel composite, a method for manufacturing the same, and a medical implant including the biodegradable polymer-gelatin hydrogel composite.

2. Description of the Related Art

A rotator cuff tear refers to an injury wherein the tendons that allow the movement of the shoulder get torn. The rotator cuff tendon has fewer cells than the stroma. The stromal cells are also very highly differentiated cells. It is reported that they require considerable time for regeneration when damaged and, even when they are regenerated, they do not fully recover their original functions.

At present, most methods for treating musculoskeletal diseases including the rotator cuff disease focus on apparent symptoms rather than their causes. They focus on alleviating inflammations through resting, anti-inflammatory agents, steroids, etc. in the early stage, and surgical treatment is considered if tear occurs afterwards. However, these therapeutic methods are merely temporary measures rather than the treatment of the causes. In addition, the rotator cuff repair surgery has the problem that there is a risk of retear in 1-2 years after the surgery.

Biological therapeutic methods including stem cell therapy are being developed to overcome these problems and limitations. However, the therapeutic method using stem cells has the problems that the therapeutic effect may be insignificant because the number of stem cells is very small at the affected site and it is difficult to supply a sufficient amount of stem cells.

Accordingly, there is an increasing need of a new material for treatment of rotator cuff tear without side effects in the body, which can maximize the therapeutic effect for musculoskeletal injury or tear, and a medical device using the same.

REFERENCES OF THE RELATED ART

Patent Documents (Patent document 1) Korean Patent Registration No. 10-2147272.

SUMMARY

The present disclosure is directed to providing a biodegradable polymer-gelatin hydrogel composite having superior durability, resilience and swellability upon wetting.

The present disclosure is also directed to providing a medical implant for treatment of rotator cuff tear, which includes the biodegradable polymer-gelatin hydrogel composite.

The present disclosure is also directed to providing a method for treating the biodegradable polymer-gelatin hydrogel composite.

The present disclosure provides a biodegradable polymer-gelatin hydrogel composite, which includes: a biodegradable polymer membrane having a nanofiber-type 3D reticular structure; and a crosslinked gelatin hydrogel formed on one or both sides of the biodegradable polymer membrane by irradiating light to a mixture including a solution of gelatin containing tyrosine groups, a photoinitiator and an electron acceptor, wherein the gelatin hydrogel forms a dityrosine bond structure as the tyrosine groups of the gelatin are crosslinked by a linker.

The present disclosure also provides a medical implant including the biodegradable polymer-gelatin hydrogel composite.

The present disclosure also provides a method for preparing a biodegradable polymer-gelatin hydrogel composite, which includes: a step of preparing a spinning solution by mixing a biodegradable polymer in an organic solvent; a step of preparing a biodegradable polymer membrane having a nanofiber-type 3D reticular structure by electrospinning the spinning solution on a substrate; a step of coating a mixture including a solution of gelatin containing tyrosine groups, a photoinitiator and an electron acceptor on one or both sides of the biodegradable polymer membrane; and a step of preparing a multi-layered biodegradable polymer-gelatin hydrogel composite having a gelatin hydrogel formed by irradiating light to the mixture-coated biodegradable polymer membrane.

The multi-layered biodegradable polymer-gelatin hydrogel composite of the present disclosure, wherein the biodegradable polymer membrane of a 3D reticular structure and the gelatin hydrogel are stacked, has superior durability and resilience and may exhibit improved elasticity and swellability upon wetting under hydration environment. In addition, it can be shrunk down to 50% of its initial volume upon drying and can maintain elasticity even after the shrinkage.

In addition, the biodegradable polymer-gelatin hydrogel composite of the present disclosure can be deformed freely with its elasticity retained, and can swell up to 300% of its initial volume under wet environment such as the inside of the body and occupy space. Therefore, when used in a medical implant, it can protect the joint from the frictional environment in the body, reinforce the muscle torn or ruptured by trauma, relive pain by maintaining space, and induce the improvement of symptoms.

The effects of the present disclosure are not limited to those mentioned above. It is to be understood that the effects of the present disclosure include all the effects that can be inferred from the following description.

DETAILED DESCRIPTION

Figure 1:
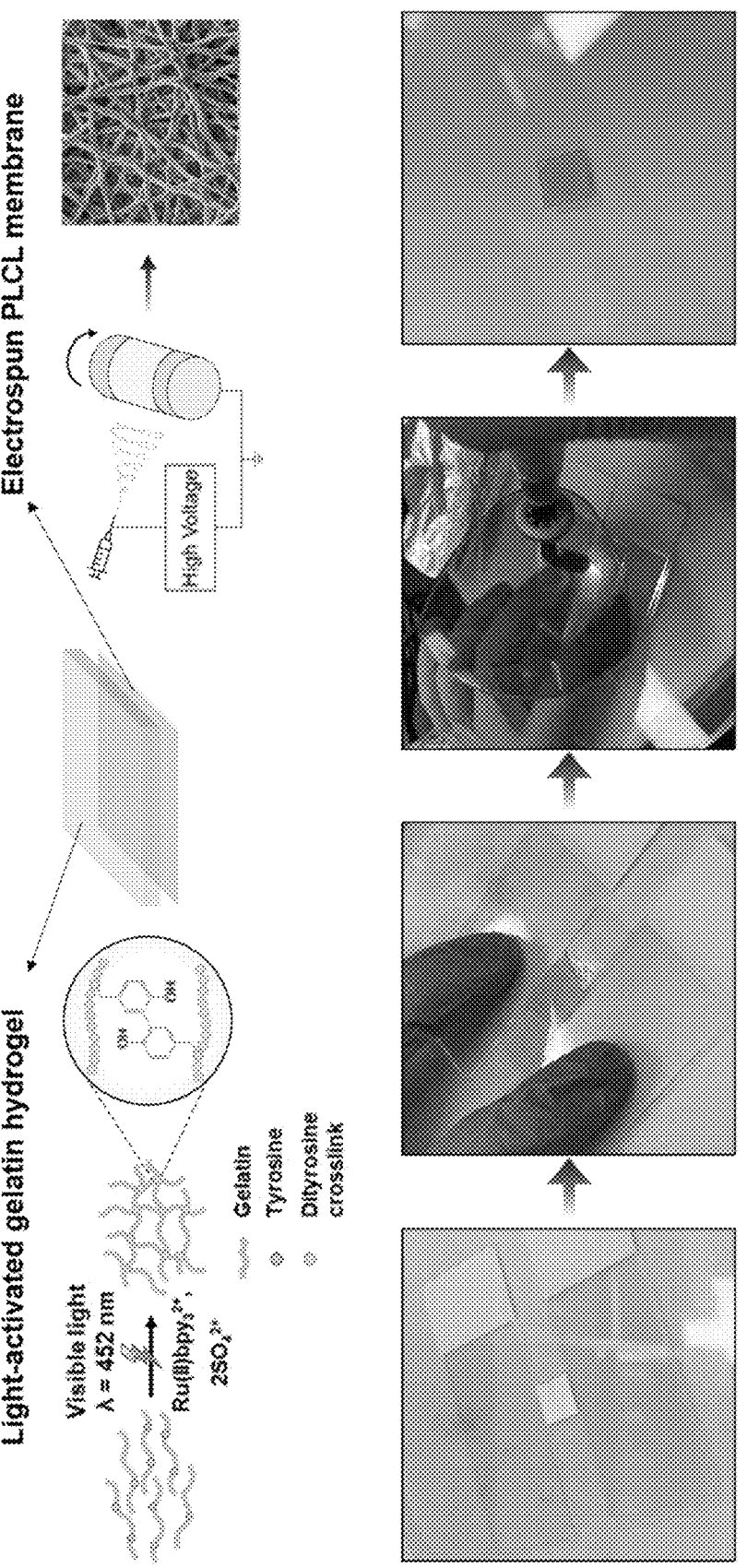
FIG. 1 schematically illustrates a method for preparing a biodegradable polymer-gelatin hydrogel composite according to the present disclosure.

Hereinafter, the present disclosure is described in detail through specific exemplary embodiments.

The present disclosure relates to a biodegradable polymer-gelatin hydrogel composite, a method for preparing the same and a medical implant including the biodegradable polymer-gelatin hydrogel composite.

As described above, the existing methods for treating rotator cuff disease are merely temporary measures rather than the treatment of the causes and rotator cuff repair has the problem that there is a risk of retear after the surgery. In addition, the therapeutic method using stem cells has the problems that the therapeutic effect is insignificant it is difficult to supply a sufficient amount of stem cells.

The multi-layered biodegradable polymer-gelatin hydrogel composite of the present disclosure, wherein the biodegradable polymer membrane of a 3D reticular structure and the gelatin hydrogel are stacked, has superior durability and resilience and may exhibit improved elasticity and swellability upon wetting under hydration environment. In addition, it can be shrunk down to 50% of its initial volume upon drying and can maintain elasticity even after the shrinkage. The composite can be deformed freely with its elasticity retained, and can swell up to 300% of its initial volume under wet environment such as the inside of the body and occupy space. In addition, when used in a medical implant, it can protect the joint from the frictional environment in the body, reinforce the muscle torn or ruptured by trauma, relive pain by maintaining space, and induce the improvement of symptoms. Furthermore, it can be degraded slowly in the body in up to one month.

Specifically, the present disclosure provides a biodegradable polymer-gelatin hydrogel composite, which includes: a biodegradable polymer membrane having a nanofiber-type 3D reticular structure; and a crosslinked gelatin hydrogel formed on one or both sides of the biodegradable polymer membrane by irradiating light to a mixture including a solution of gelatin containing tyrosine groups, a photoinitiator and an electron acceptor, wherein the gelatin hydrogel forms a dityrosine bond structure as the tyrosine groups of the gelatin are crosslinked by a linker.

The biodegradable polymer membrane may be a polymer membrane having a 3D reticular structure formed by electrospun nanofibers and may be formed of a biocompatible and biodegradable polymer having superior resilience. The biodegradable polymer membrane may protect and support the gelatin hydrogel in the frictional environment in the body and may enhance the durability of a medical implant.

The nanofiber constituting the biodegradable polymer membrane may have an average diameter of 10 nm to 100 μm, specifically 100 nm to 10 μm. If the average diameter of the nanofiber is smaller than 10 nm, the engraftment and material exchange with nearby tissue may be difficult. Otherwise, if it exceeds 100 μm, the resilience of the polymer membrane material may not meet the expectation or the swellability upon wetting may be unsatisfactory due to decreased pores in the 3D reticular structure.

As a specific example, the biodegradable polymer membrane may be formed of one or biodegradable polymer selected from a group consisting of poly(lactide-co-ε-caprolactone) (PLCL), poly(lactide-co-glycolide) (PLGA), polyglycolide (PGA), poly-L-lactide (PLLA), poly-D,L-lactide (PDLLA) and poly-ε-caprolactone (PCL).

Specifically, the biodegradable polymer membrane may be formed of poly(lactide-co-ε-caprolactone) (PLCL), poly(lactide-co-glycolide) (PLGA) or a mixture thereof, most specifically poly(lactide-co-ε-caprolactone) (PLCL).

The gelatin hydrogel may be formed on one or both sides of the biodegradable polymer membrane, and may be crosslinked by irradiating light to a mixture including a solution of gelatin containing tyrosine groups, a photoinitiator and an electron acceptor. In particular, the gelatin hydrogel may form a dityrosine bond structure as the tyrosine groups of the gelatin are crosslinked by a linker due to the light irradiation.

The solution of gelatin containing tyrosine groups may be formed by uniformly mixing gelatin and a photoinitiator using a homogenizer. The solution of gelatin containing tyrosine groups may form a gelatin hydrogel upon light irradiation as a result of crosslinking and gelation owing to interaction between the tyrosine groups which are organic linkers. The concentration of the solution of gelatin containing tyrosine groups may be 5-30 wt % based on the solvent. Outside the concentration range, physical properties may not be suitable for insertion of the implant due to significantly decreased or increased crosslinking efficiency.

The gelatin hydrogel is advantageous in that it can hold 60-97% of water to provide an environment similar to that inside the body, can be shrunk to about 50% of its initial volume after drying, and can retain elasticity even after the shrinkage. In addition, it can be rolled or folded without deformation, cracking or tearing at all. In addition to these physical properties, it can be advantageously applied to a medical device or a medical implant because it has superior biocompatibility and thus has no side effects.

The gelatin hydrogel may be crosslinked by irradiating light to a mixture including 0.5-20 parts by weight of a photoinitiator and 0.5-15 parts by weight of an electron acceptor based on 100 parts by weight of a solution of gelatin containing tyrosine groups. Specifically, the content of the photoinitiator may be 1-10 parts by weight, and the content of the electron acceptor may be 1-10 parts by weight.

The content of the gelatin hydrogel may be 90-99.95 vol %, specifically 95-99.8 vol %, more specifically 98-99.7 vol %, based on 100 vol % of the biodegradable polymer-gelatin hydrogel composite. If the content of the gelatin hydrogel is below 90 vol %, the biodegradable polymer-gelatin hydrogel composite may not be suitable for a medical implant due to unsatisfactory shrinkability and resilience. Otherwise, if it exceeds 99.95 vol %, unwanted tissue damage or side effects may be caused due to excessive wettability and swellability when the biodegradable polymer-gelatin hydrogel composite is used for a medical implant.

The present disclosure also provides a medical implant including the biodegradable polymer-gelatin hydrogel composite.

The medical implant may be for insertion into the joint. The insertion into the joint may be for insertion into the articular space, e.g., the soft tissue between the hard tissues of the joint. Specifically, it may be for treatment of rotator cuff tear, prosthetics of intraarticular soft tissue, knee joint or shoulder joint, although not being limited thereto.

The present disclosure also provides a method for preparing a biodegradable polymer-gelatin hydrogel composite, which includes: a step of preparing a spinning solution by mixing a biodegradable polymer in an organic solvent; a step of preparing a biodegradable polymer membrane having a nanofiber-type 3D reticular structure by electrospinning the spinning solution on a substrate; a step of coating a mixture including a solution of gelatin containing tyrosine groups, a photoinitiator and an electron acceptor on one or both sides of the biodegradable polymer membrane; and a step of preparing a multi-layered biodegradable polymer-gelatin hydrogel composite having a gelatin hydrogel formed by irradiating light to the mixture-coated biodegradable polymer membrane.

FIG. 1 schematically illustrates the method for preparing a biodegradable polymer-gelatin hydrogel composite according to the present disclosure. Referring to FIG. 1, after forming a biodegradable polymer membrane having a nanofiber-type 3D reticular structure through electrospinning, a mixture including a solution of gelatin containing tyrosine groups, a photoinitiator and an electron acceptor is coated on the biodegradable polymer membrane. Then, a multi-layered biodegradable polymer-gelatin hydrogel composite is formed by forming a gelatin hydrogel by irradiating light to the mixture.

Hereinafter, each step of the method is described in detail.

In the step of preparing the spinning solution, the organic solvent may be one or more selected from a group consisting of 1,1,1,3,3,3-hexafluoro-2-propanol (HFIP), N,N-dimethylacetamide (DMAc), N,N-dimethylformamide (DMF), N-methyl-2-pyrrolidinone (NMP), dimethyl sulfoxide (DMSO), tetrahydrofuran (THF), ethylene carbonate (EC), diethyl carbonate (DEC), dimethyl carbonate (DMC), ethyl methyl carbonate (EMC), propylene carbonate (PC), water, acetic acid, formic acid, chloroform, dichloromethane, acetone and isopropyl alcohol, specifically 1,1,1,3,3,3-hexafluoro-2-propanol (HFIP).

The biodegradable polymer may be one or more selected from a group consisting of poly(lactide-co-ε-caprolactone) (PLCL), poly(lactide-co-glycolide) (PLGA), polyglycolide (PGA), poly-L-lactide (PLLA), poly-D,L-lactide (PDLLA) and poly-ε-caprolactone (PCL).

Specifically, the biodegradable polymer membrane may be poly(lactide-co-ε-caprolactone) (PLCL), poly(lactide-co-glycolide) (PLGA) or a mixture thereof, most specifically poly(lactide-co-ε-caprolactone) (PLCL).

In the step of preparing the biodegradable polymer membrane, the electrospinning may be performed under the condition of an applied voltage of 1-50 kV, a spinning distance of 3-30 cm and a spinning speed of 0.01-5 mL/hr. Specifically, the electrospinning may be performed under the condition of an applied voltage of 10-30 kV, a spinning distance of 5-20 cm and a spinning speed of 0.05-3 mL/hr, most specifically under the condition of an applied voltage of 15-25 kV, a spinning distance of 10-15 cm and a spinning speed of 0.1-1 mL/hr. If any of the applied voltage, the spinning distance and the spinning speed does not satisfy the above-mentioned condition, resilience and swellability upon wetting may be unsatisfactory since a nanofiber with an appropriate length is not formed or a polymer membrane having a 3D reticular structure is not formed as desired.

In the step of coating the mixture, the mixture may include a solution of gelatin containing tyrosine groups, a photoinitiator and an electron acceptor. The solution of gelatin containing tyrosine groups may be formed by uniformly mixing gelatin and a photoinitiator using a homogenizer.

The photoinitiator may initiate polymerization when light is irradiated to the mixture coated on the surface of the biodegradable polymer membrane. The photoinitiator may be a concentrated solution with a concentration of 1-100 mM, specifically 10-30 mM. Specifically, it may be one or more selected from a group consisting of tris(2,2'-bipyridyl) dichlororuthenium(II) hexahydrate, riboflavin (RF), riboflavin 5'-monophosphate sodium salt (RFp), eosin Y (EY), 2,2'-azobis[2-methyl-N-(2-hydroxyethyl)propionamide (VA-086) and lithium phenyl-2,4,6-trimethylbenzoylphosphinate (LAP). More specifically, it may be tris(2,2'-bipyridyl)dichlororuthenium(II) hexahydrate.

The electron acceptor may accept electrons from the photoinitiator and covalently bond the carbon atoms of the gelatin molecular chain during the crosslinking by light irradiation. The electron acceptor may be a salt containing a group V or higher atom or anion. Specifically, it may be one or more selected from a group consisting of sodium sulfate, sodium nitrate and sodium hydroxide. Most specifically, it may be sodium sulfate. The electron acceptor may be a concentrated solution with a concentration of 1 mM to 5 M, specifically 5 mM to 100 mM, most specifically 15-50 mM.

The mixture may include 0.5-20 parts by weight of the photoinitiator and 0.5-15 parts by weight of the electron acceptor based on 100 parts by weight of the solution of gelatin containing tyrosine groups. Specifically, it may include 1-10 parts by weight of the photoinitiator and 1-10 parts by weight of the electron acceptor.

If the content of the photoinitiator is below 0.5 part by weight, the mixture may not be gelated because polymerization dos not occur as desired during the light irradiation. Otherwise, if it exceeds 20 parts by weight, a hydrogel with unsatisfactory elasticity and wettability due to excessive polymerization and cytotoxicity may be induced by the residual photoinitiator.

And, if the content of the electron acceptor is below 1 part by weight, crosslinking may not be achieved appropriately due to sluggish movement of electrons during the crosslinking reaction, which may negatively affect the swellability upon wetting and elasticity of the hydrogel. Otherwise, if the content of the electron acceptor exceeds 15 parts by weight, the electron acceptor remaining without being removed may induce cytotoxicity.

In the step of preparing the biodegradable polymer-gelatin hydrogel composite, the light irradiation may be performed by irradiating UV with a wavelength of 300-600 nm and an intensity of 1000-1500 mW/cm$^2$ for 30 seconds to 5 minutes. Specifically, UV with a wavelength of 350-500 nm and an intensity of 1100-1300 mW/cm$^2$ may be irradiated for 40 seconds to 3 minutes. Most specifically, UV with a wavelength of 420-480 nm and an intensity of 1150-1250 mW/cm$^2$ may be irradiated for 30-60 seconds.

If any of the wavelength, UV intensity and irradiation time is not satisfied, gelation may not occur as desired, energy may be wasted uneconomically or a hard hydrogel with poor elasticity and wettability may be formed due to excessive crosslinking.

In particular, although it was not described explicitly in the following example or test examples, mechanical properties such as tensile strength, impact strength, durability, elasticity and wettability were tested for biodegradable polymer-gelatin hydrogel composites prepared by the method for preparing a biodegradable polymer-gelatin hydrogel composite according to the present disclosure under different conditions.

As a result, it was confirmed that structural stability can be ensured due to superior tensile strength, impact strength and durability and, at the same time, application to a medical implant is possible due to high elasticity and wettability when all of the following seven conditions are satisfied.

(1) The organic solvent is 1,1,1,3,3,3-hexafluoro-2-propanol (HFIP). (2) The biodegradable polymer is poly(lactide-co-ε-caprolactone) (PLCL). (3) In the step of preparing the biodegradable polymer membrane, the electrospinning is performed under the condition of an applied voltage of 15-25 kV, a spinning distance of 10-15 cm and a spinning speed of 0.1-1 mL/hr. (4) The photoinitiator is 10-30 mM tris(2,2'-bipyridyl)dichlororuthenium(II) hexahydrate. (5) The electron acceptor is 15-50 mM sodium sulfate. (6) The mixture includes 1-10 parts by weight of the photoinitiator and 1-10 parts by weight of the electron acceptor based on 100 parts by weight of the gelatin solution. (7) In the step of preparing the biodegradable polymer-gelatin hydrogel composite, the light irradiation is performed by irradiating UV with a wavelength of 420-480 nm and an intensity of 1150-1250 mW/cm$^2$ for 30-60 seconds.

When any of the above seven conditions was not satisfied, the mechanical properties such as tensile strength, impact strength, durability, elasticity and wettability were unsatisfactory to meet the requirements of medical implants.

As described above, the biodegradable polymer-gelatin hydrogel composite of the present disclosure, having a multi-layered structure wherein a biodegradable polymer membrane having elasticity and a gelatin hydrogel are stacked, has superior durability and resilience and may exhibit 100-300% of high elasticity and swellability upon wetting because its volume under hydration environment after drying is increased by about 50% or more as compared to its initial volume. In addition, it can be shrunk down to 50% of its initial volume upon drying and can maintain elasticity even after the shrinkage. The biodegradable polymer-gelatin hydrogel composite can be deformed freely with its elasticity retained, and can swell up to 300% of its initial volume under wet environment such as the inside of the body and occupy space. Therefore, when used in a medical implant, it can protect the joint from the frictional environment in the body, reinforce the muscle torn or ruptured by trauma, relive pain by maintaining space, and induce the improvement of symptoms.

Hereinafter, the present disclosure is described more specifically through examples. However, the present disclosure is not limited by the examples.

Example 1: Preparation of Biodegradable Polymer-Gelatin Hydrogel Composite

A spinning solution was prepared by dissolving a poly (lactide-co-ε-caprolactone) (PLCL) polymer in a 1,1,1,3,3,3-hexafluoro-2-propanol (HFIP) solvent. Then, a biodegradable polymer membrane having a nanofiber-type 3D reticular structure was formed by electrospinning the spinning solution on a glass substrate under the condition of an applied voltage of 21 kV, a spinning distance of 12 cm and a spinning speed of 0.4 m L/h r.

In addition, a 25% (w/v) gelatin solution was prepared by dissolving 250 mg of tyrosine group-containing gelatin B powder (Sigma) in 1 mL of PBS and stirring in a water bath at 40° C. Tris(2,2'-bipyridyl)dichlororuthenium(11) hexahydrate (Ru(II)bpy$_3$$^{2+}$; Sigma) was used as a photoinitiator and sodium sulfate (SPS; Sigma) was used as an electron acceptor. A stock solution was prepared by mixing 25 mM Ru(II)bpy$_3$$^{2+}$ (3.7 mg in 200 μL of DW) and 50 mM SPS in distilled water (DW). Then, a mixture was prepared by adding 100 parts by weight of the gelatin solution, 4 parts by weight of Ru(II)bpy$_3$$^{2+}$ and 3 parts by weight of SPS and mixing with a vortexer.

Subsequently, after coating the mixture on one side of the biodegradable polymer membrane, a multi-layered biodegradable polymer-gelatin hydrogel composite with a cross-linked gelatin hydrogel formed was prepared by irradiating blue UV light with a wavelength of 460 nm and an intensity of 1200 mW/cm$^2$ for 60 seconds using an LED dental curing lamp (IBlast).

Test Example 1: Evaluation of Swellability

In order to investigate the swellability of the biodegradable polymer-gelatin hydrogel composite prepared in Example 1 after drying depending on temperature, the biodegradable polymer-gelatin hydrogel composite was dried and then completely immersed in distilled water of 100 times the volume of the composite at 37° C. or 25° C. Then, swellability was investigated under the hydration environment for 24 hours. The result is shown in FIGS. 2 and 3.

Figure 2:
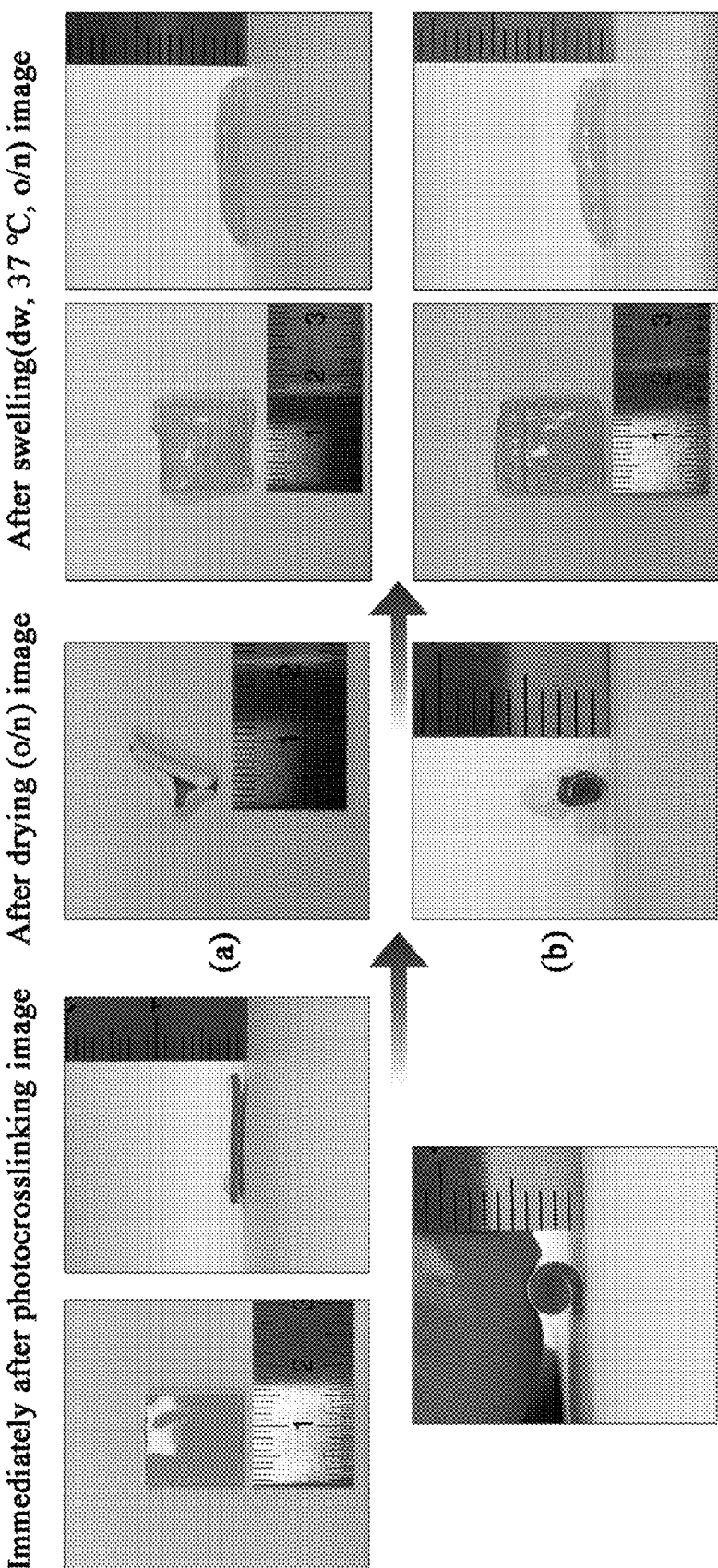
FIG. 2 shows a result of evaluating the swellability of a biodegradable polymer-gelatin hydrogel composite prepared in Example 1 at 37° C. after drying.

FIG. 2 shows a result of evaluating the swellability of the biodegradable polymer-gelatin hydrogel composite prepared in Example 1 at 37° C. after drying. Referring to FIG. 2, it was confirmed that the composite had a thickness of 1 mm immediately after the gelatin hydrogel on one side of the biodegradable polymer was photocrosslinked, and was shrunk down to about 50% of its initial volume after drying. As a result of investigating swellability at 37° C., it was also confirmed that the composite swelled about 2 times of its initial volume, with a thickness of 2 mm.

Figure 3:
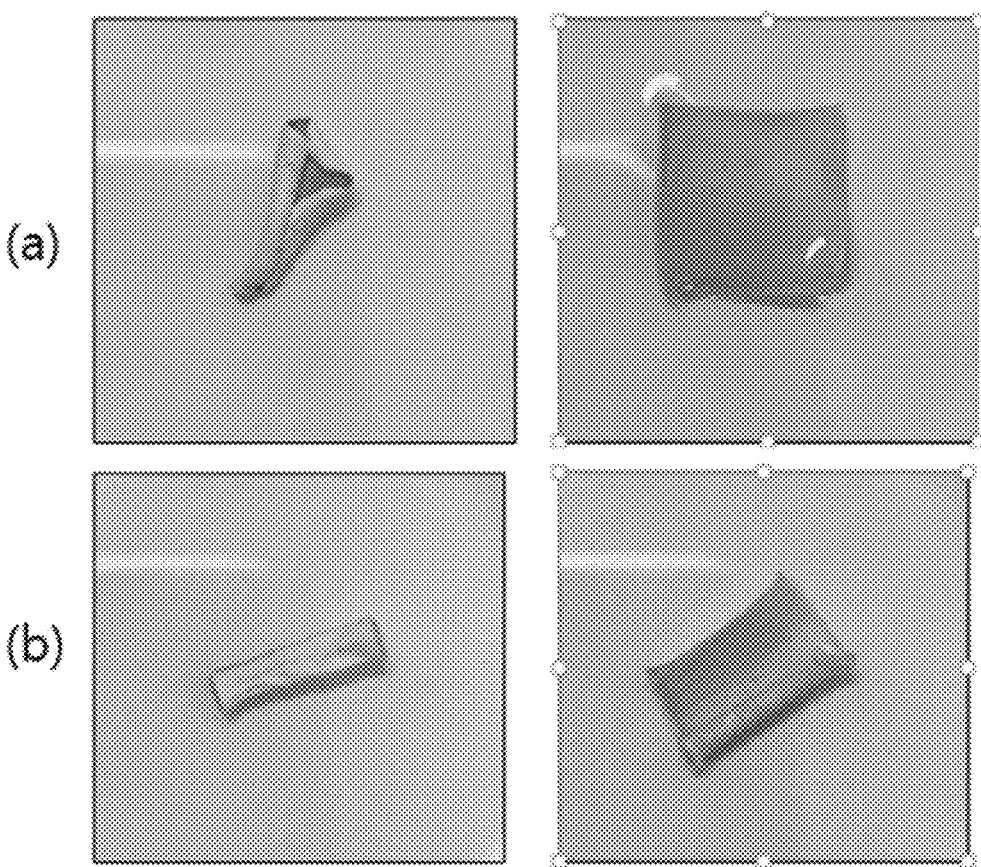
FIG. 3 shows a result of evaluating the swellability of a biodegradable polymer-gelatin hydrogel composite prepared in Example 1 at 25° C. after drying.

FIG. 3 shows a result of evaluating the swellability of the biodegradable polymer-gelatin hydrogel composite prepared in Example 1 at 25° C. after drying. As shown in FIG. 3, the composite had superior swellability at 25° C. after drying. In addition, it was confirmed that it has superior resilience even after the shrinkage or swelling with no deformation, cracking or tearing.

Test Example 2: Evaluation of Degree of Wetting and Swelling

For the biodegradable polymer-gelatin hydrogel composite prepared in Example 1, the degree of wetting and swelling of the gelatin hydrogel was investigated. For investigation of the gel content of the gelatin hydrogel depending on the concentration of the electron acceptor (5, 10, 15, 25 and 50 mM) and light irradiation time (10, 20, 30, 40, 50 and 60 seconds), 50 μL of a sample of the gelatin hydrogel prepared in Example 1 was prepared and observed for 48 hours after immersing in 5 mL of distilled water. Then, uncrosslinked gelatin was collected, freeze-dried and then weighed. The gel content was calculated according to the following equation. The result is shown in FIG. 4.

$$\text{Gel content } (\%) = W_h/(W_h + W_s) \times 100$$

($W_h$: weight of hydrogel, $W_s$: weight of uncrosslinked, suspending gel 48 hours later)

Figure 4:
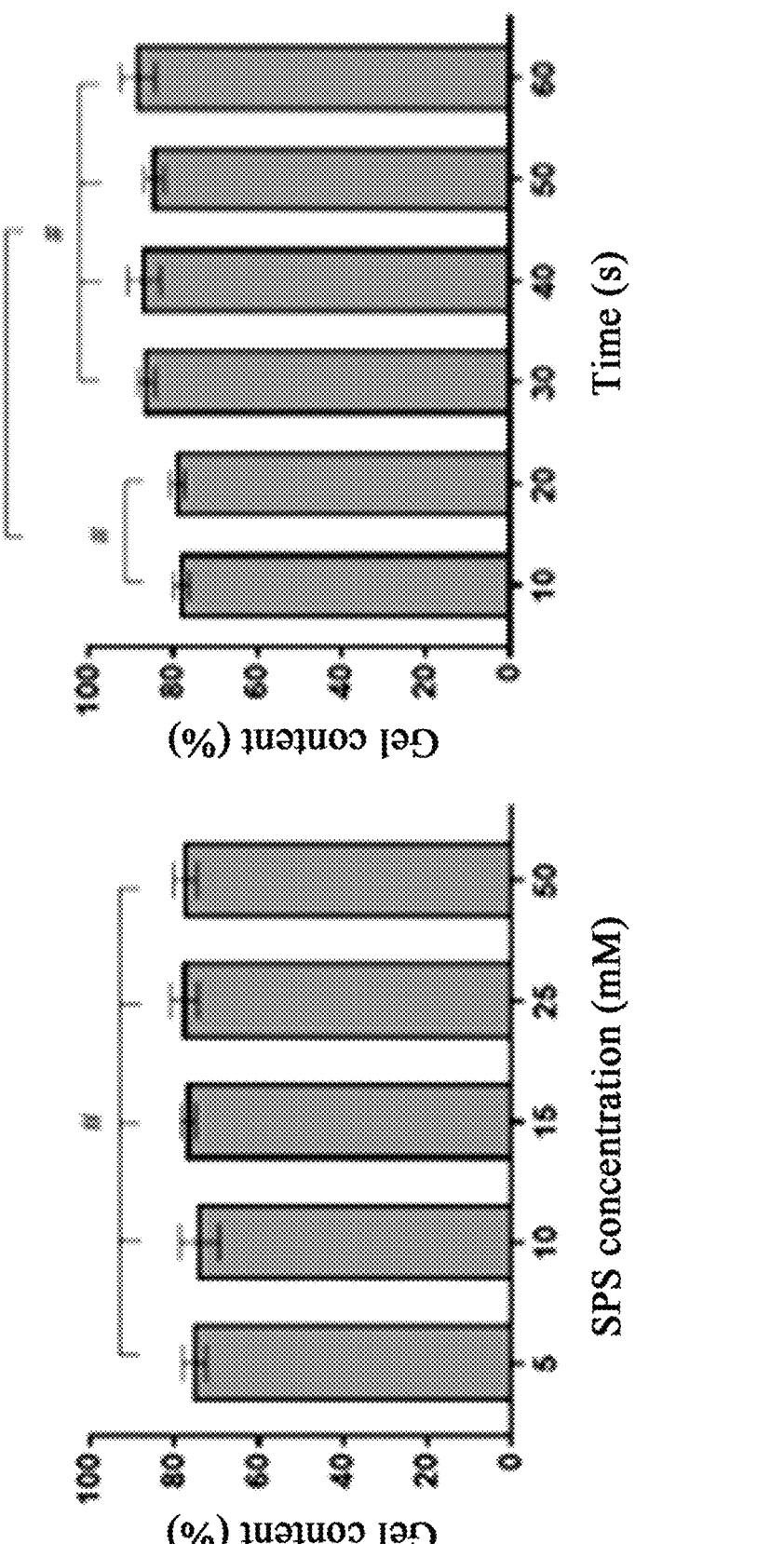
FIG. 4 shows a result of measuring the gel content of a gelatin hydrogel prepared in Example 1 depending on the concentration of an electron acceptor (5, 10, 15, 25 and 50 mM) and light irradiation time (10, 20, 30, 40, 50 and 60 seconds).

FIG. 4 shows a result of measuring the gel content of the gelatin hydrogel prepared in Example 1 depending on the concentration of the electron acceptor (5, 10, 15, 25 and 50 mM) and light irradiation time (10, 20, 30, 40, 50 and 60 seconds). Referring to FIG. 4 (a), the gelatin hydrogel showed superior gel contents when the concentration of the electron acceptor SPS was 5-50 mM, and showed the best gel content at 15-50 mM.

In addition, referring to FIG. 4 (*b*), the gelatin hydrogel showed a high gel content of 80% or higher when the light irradiation time was 30-60 seconds, and showed the best result when the light irradiation time was 60 seconds.

In addition, in order to measure the degree of swelling, the weight of the swollen hydrogel was measured depending on time (0, 5, 25, 50, 100 and 180 hours), and swelling rate was calculated according to the following equation. The result is shown in FIG. 5.

$$\text{Swelling ratio } (\%) = W_s/W_o \times 100$$

($W_s$: gel weight after swelling, $W_o$: initial weight of gel)

Figure 5:
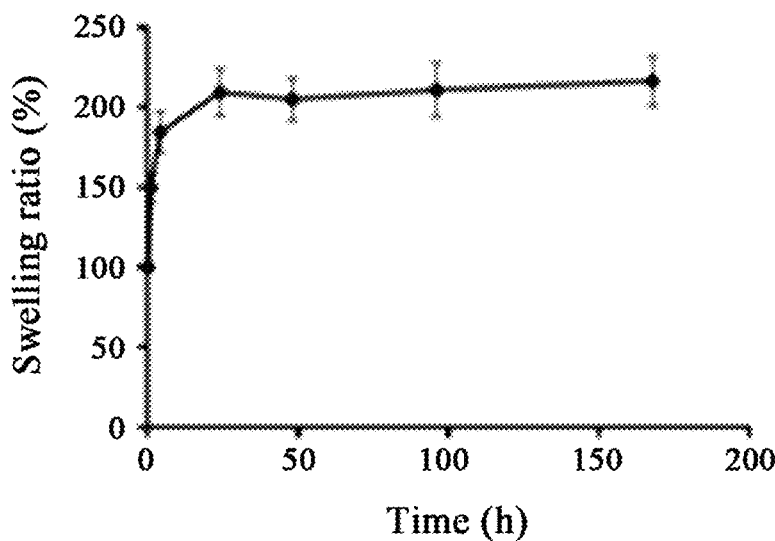
FIG. 5 shows a result of measuring the swelling rate of a gelatin hydrogel prepared in Example 1 depending on time (0, 5, 25, 50, 100 and 180 hours).

FIG. 5 shows a result of measuring the swelling rate of the gelatin hydrogel prepared in Example 1 depending on time (0, 5, 25, 50, 100 and 180 hours). Referring to FIG. 5, it was confirmed that the gelatin hydrogel swelled up to 210% after 24 hours under wet environment, and the swelling rate was maintained for 150 hours or longer.

What is claimed is:

1. A method for preparing a biodegradable polymer-gelatin hydrogel composite, comprising:

preparing a spinning solution by mixing a biodegradable polymer in an organic solvent;

preparing a biodegradable polymer membrane having a nanofiber-type 3D reticular structure by electrospinning the spinning solution on a substrate;

coating a mixture comprising a solution of gelatin containing tyrosine groups, a photoinitiator and an electron acceptor on one or both sides of the biodegradable polymer membrane; and preparing a multi-layered biodegradable polymer-gelatin hydrogel composite having a gelatin hydrogel formed by irradiating light to the mixture-coated biodegradable polymer membrane, wherein the organic solvent is 1,1,1,3,3,3-hexafluoro-2-propanol (HFIP), wherein the biodegradable polymer is poly (lactide-co-E-caprolactone) (PLCL), wherein, in said preparing the biodegradable polymer membrane, the electrospinning is performed under the condition of an applied voltage of 15-25 kV, a spinning distance of 10-15 cm and a spinning speed of 0.1-1 mL/hr, wherein the photoinitiator is 10-30 mM tris (2,2'-bipyridyl) dichlororuthenium (II) hexahydrate, wherein the electron acceptor is 15-50 mM sodium sulfate, wherein the mixture comprises 1-10 parts by weight of the photoinitiator and 1-10 parts by weight of the electron acceptor based on 100 parts by weight of the gelatin solution, and wherein, in said preparing the biodegradable polymer-gelatin hydrogel composite, the light irradiation is performed by irradiating UV with a wavelength of 420-480 nm and an intensity of 1150-1250 mW/cm² for 30-60 seconds.

* * * * *